(12) United States Patent
Plate et al.

(10) Patent No.: US 9,880,832 B2
(45) Date of Patent: Jan. 30, 2018

(54) SOFTWARE PATCH EVALUATOR

(71) Applicants: Henrik Plate, Nice (FR); Serena Ponta, Mougins (FR); Antonino Sabetta, Mougins (FR)

(72) Inventors: Henrik Plate, Nice (FR); Serena Ponta, Mougins (FR); Antonino Sabetta, Mougins (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/640,536

(22) Filed: Mar. 6, 2015

(65) Prior Publication Data
US 2016/0259636 A1 Sep. 8, 2016

(51) Int. Cl.
G06F 9/44 (2006.01)
G06F 9/445 (2006.01)
G06F 11/36 (2006.01)

(52) U.S. Cl.
CPC .............. *G06F 8/68* (2013.01); *G06F 11/366* (2013.01)

(58) Field of Classification Search
None
See application file for complete search history.

(56) References Cited

U.S. PATENT DOCUMENTS

| | | | |
|---|---|---|---|
| 6,477,703 B1 | 11/2002 | Smith et al. | |
| 7,080,372 B1* | 7/2006 | Cole | G06F 8/64 707/999.202 |
| 7,191,435 B2 | 3/2007 | Lau et al. | |
| 7,735,078 B1* | 6/2010 | Vaidya | G06F 8/68 717/168 |
| 7,765,538 B2 | 7/2010 | Zweifel et al. | |
| 7,895,592 B2 | 2/2011 | Subramanian et al. | |
| 8,205,195 B2 | 6/2012 | Wagner et al. | |
| 8,276,123 B1* | 9/2012 | Deng | G06F 11/368 714/37 |
| 8,479,163 B2* | 7/2013 | Kumar | G06F 11/3688 717/124 |
| 8,539,469 B2 | 9/2013 | Field et al. | |
| 8,607,208 B1 | 12/2013 | Arnold et al. | |
| 8,683,450 B2 | 3/2014 | Keromytis et al. | |
| 8,745,611 B2 | 6/2014 | Saraf et al. | |
| 8,819,131 B2 | 8/2014 | Hebert et al. | |
| 2005/0235012 A1* | 10/2005 | Harry | G06F 8/71 |

(Continued)

OTHER PUBLICATIONS

Lile Hattori et al., "Mining Software Repositories for Software Change Impact Analysis: A Case Study", SBBD '08 Proceedings of the 23rd Brazilian Symposium on Databases, Oct. 13, 2008, pp. 210-223.

*Primary Examiner* — Insun Kang
(74) *Attorney, Agent, or Firm* — Brake Hughes Bellerman LLP

(57) ABSTRACT

Automated systems and methods for assessing the urgency of installing a patch for a component of a software application are described. The systems and methods involve identifying a set of defective programming constructs of the component that are altered by the patch, collecting execution traces of programming constructs of the software application and programming constructs of the component in a context of application use, and evaluating the execution traces to determine whether one or more defective programming constructs of the component are invoked in the context of application use.

20 Claims, 10 Drawing Sheets

(56) References Cited

U.S. PATENT DOCUMENTS

| | | | |
|---|---|---|---|
| 2005/0240903 A1* | 10/2005 | Lake | G06Q 10/04 717/124 |
| 2006/0080656 A1* | 4/2006 | Cain | G06F 8/65 717/174 |
| 2006/0117310 A1* | 6/2006 | Daniels | G06F 8/68 717/168 |
| 2006/0288341 A1 | 12/2006 | Wurden et al. | |
| 2007/0074188 A1* | 3/2007 | Huang | G06F 21/54 717/141 |
| 2007/0113225 A1* | 5/2007 | Felts | G06F 8/65 717/172 |
| 2008/0082957 A1* | 4/2008 | Pietschker | G06Q 10/10 717/101 |
| 2008/0127118 A1 | 5/2008 | Kasman et al. | |
| 2008/0263538 A1* | 10/2008 | Bando | G06F 8/65 717/171 |
| 2009/0144716 A1 | 6/2009 | Felts et al. | |
| 2009/0204946 A1* | 8/2009 | Fienblit | G06F 8/71 717/124 |
| 2009/0319984 A1* | 12/2009 | Hodges | G06F 11/008 717/105 |
| 2011/0107166 A1* | 5/2011 | Flautner | G06F 11/1604 714/746 |
| 2011/0239200 A1* | 9/2011 | Binsztok | G06F 8/311 717/140 |
| 2012/0084766 A1* | 4/2012 | Shanmugam | G06F 8/65 717/173 |
| 2012/0192172 A1 | 7/2012 | Hansmann et al. | |
| 2013/0152044 A1* | 6/2013 | Salecker | G06F 8/70 717/120 |
| 2014/0137097 A1* | 5/2014 | Sakai | G06F 8/65 717/172 |
| 2014/0149435 A1* | 5/2014 | Sisman | G06F 11/362 707/751 |
| 2014/0282485 A1* | 9/2014 | Nakamura | G06F 8/65 717/173 |
| 2014/0317452 A1* | 10/2014 | Tonouchi | G06F 11/3604 714/38.1 |
| 2014/0365833 A1* | 12/2014 | Bourne | G06F 11/3636 714/45 |
| 2015/0178070 A1* | 6/2015 | Doi | G06F 8/61 717/172 |
| 2015/0254162 A1* | 9/2015 | Baril | G06F 11/3636 717/128 |
| 2015/0370690 A1* | 12/2015 | Rodmell | G06F 8/72 717/124 |
| 2016/0004626 A1* | 1/2016 | Jain | G06F 11/008 717/130 |
| 2016/0004627 A1* | 1/2016 | Farchi | G06F 11/3688 717/127 |
| 2016/0004629 A1* | 1/2016 | Bharara | G06F 11/3692 714/38.1 |
| 2016/0092185 A1* | 3/2016 | Botti | G06F 8/60 717/103 |

\* cited by examiner

```
600
 1  {
 2    "vca" : "http://evn.apache.org/repoa/aaf/exf/",
 3    "search" : "_CVE-2013-0239",
 4    "revision" : "1438424",
 5    "timestamp": "14042 8475 7438",
 6    "conatructChanges" : {
 7      ("type" = "MOD", "Construct" = { "lang" : "JAVA", "type" : "PACK", "qname" : "org.apache.exf.ayateat.wa.policy"} },
 8      ("type" = "MOD", "Construct" = { "lang" : "JAVA", "type" : "PACK", "qname" : "org.apache.exf.ayateat.wa.policy.avaFirstPolicyService,
 9      ("type" = "MOD", "Construct" = { "lang" : "JAVA", "type" : "PACK", "qname" : "org.apache.exf..vs.security.wss 4j" } },
10      ("type" = "MOD", "Construct" = { "lang" : "JAVA", "type" : "PACK", "qname" : "org.apache.exf..vs.security.wss 4j.policyvalidators* } },
11      ("type" = "MOD", "Construct" = { "lang" : "JAVA", "type" : "PACK", "qname" : "org.apache.exf..vs.security.wss
        4j.policyvalidators.username
```

FIG. 6

```
900
 1   {
 2       "project.groupId" : "sap.par",
 3       "project.artifactId" : "patcha",
 4       "project.version" : "0.0.1-SNAPSHOT",
 5       "username" : "I027962",
 6       "computername" : "NCEN60230187A",
 7       "resources" : [
 8           {
 9               "archiveDigest" : "511993D3C99719E38A6779073019DACD7178DDB9",
10               "archiveFileName" : "surefire-booter-2.14.jar",
11               "resourceProperties" : {
12                   "Implementation-Vendor" : "The Apache Software Foundation",
13                   "Implementation-Title" : "SureFire Booter",
14                   "Implementation-Veraion" : "2.14",
15                   "Implementation-Vendor-Id" : "org.apache.maven.surefire",
16                   "Specification-Vendor" : "e Apache Software Foundation", "Build-Jdk" : "1.5.0_19",
17                   "SureFire Booter", "Specification-Version" : _2.14", "Archiver-Veraion" : "Plexus Art
18               "ConstructUsage" : {
19                   "timestamp" : "1404387016639",
20                   "archiveFileName" : "surefire-booter-2.14.jar",
21                   "ArchiveDigest" : -511993D3C99719E38A6779073019DACD7178DD39",
22                   "Construct" : {
23                       "lang" : "JAVA",
24                       "type" : "METH",
25                       "qname" : "org.apache.maven.surefire.booter.ForkedBooter.main(java.lang.string[])" } }
26               },
27               "timestamp" : "1404387016655",,
```

1010
Identify a set of defective programming constructs of the component that are altered by the patch

1012
Compare a pre-patch version and a post-patch version of the source code of the component to identify defective programming constructs of the component that are altered by the patch

1014
Retrieve executable files of the component that have been added, deleted or modified by the patch from the pre-patch and the post-patch versions of the source code of the component

1016
Create abstract syntax tree (AST) representations of the executable files, wherein the ASTs define programming constructs of the executable files.

1018
Add all programming constructs identified by the respective AST representations of the added or deleted executable files the set of defective programming constructs of the component

1019
Compare AST representations of pre-patch and post-patch versions of the executable file to identify programming constructs that have been modified by the patch

1020
Collect execution traces of programming constructs of the software application and programming constructs of the component in a context of application use

1030
Evaluate the execution traces to determine whether one or more defective programming constructs of the component are invoked in the context of application use

FIG. 10

SOFTWARE PATCH EVALUATOR

BACKGROUND

Businesses and organizations world wide rely more and more on networked computer systems for information and services. The computer systems can include computing devices as well as computer networks such as private and public networks (including the Internet). A business' computer system may have a software codebase of hundreds or thousands of different computer applications or software ("software applications"). The software applications may include some applications that have been internally developed and other applications that are vendor-developed. In either case, the applications may include numerous common components ("third-party components") that are developed by or sourced from third parties. A single third-party component may be utilized or deployed in more than one software application.

A third-party component may be later discovered to have a defect, bug, or software "vulnerability" (e.g., a weakness or mistake that can be directly used by an unauthorized third party to gain access to a computer system or network). A remedy may involve replacement of the defective component or installation of "software patch" to correct the defect or bug. Maintenance of software applications, each of which may include several third-party components, can include installation of patches for defective third-party components to ensure that the software applications execute or run securely and as intended. Such maintenance of software applications may involve complex logistics and can be costly. However, remedying a defective component in a particular software application may or may not be urgent depending on the use or impact of the defective component in the particular application context. Accordingly, a software application maintainer may prioritize installation of a patch for a defective software application component based on, for example, an assessment of the relevance (e.g., exploitability of the defect in the case of a security bug) of the defective component in the particular application context. For example, a software application may include a "printer" component. However, if the application cannot be used for printing, it may not be critical or important to patch a defective printer component in the application immediately.

Traditionally, the (software) defect in the third-party component is described only at an abstract level (e.g., in a natural language description of coarse-grained component functionality and the potential impact of the vulnerability). A human assessment of the severity of the defect in an application context, which is based, for example, on the natural language description and expert knowledge of the use of the component, can be erroneous—leading to both false positives and false negatives.

Consideration is being given to automated systems and methods for assessing the context-specific relevance or importance of patching defective components in software applications.

SUMMARY

Computer-implemented solutions for assessing the urgency of installing a patch for a defect in a component of a software application are described herein.

In a general aspect, the solutions involve identifying a set of defective programming constructs of the component that are altered by the patch, and collecting execution traces of programming constructs of the software application and programming constructs of the component in a context of application use. The solutions further involve evaluating the execution traces to determine whether one or more defective programming constructs of the component are invoked in the context of application use. The urgency of installing the patch can be based on whether the one or more defective programming constructs of the component are invoked in the context of application use.

The details of one or more implementations are set forth in the accompanying drawings and the description below. Further features of the disclosed subject matter, its nature and various advantages will be more apparent from the accompanying drawings, the following detailed description, and the claims.

BRIEF DESCRIPTION OF THE DRAWINGS

FIG. 6 illustrates an excerpt of an example change list C (in JSON notation) in a use case for the OSS component Apache CXF, revision 1438424, in accordance with the principles of the disclosure herein.

FIG. 9 illustrates example execution traces collected for a Java application in an application context using the process of FIG. 8, in accordance with the principles of the disclosure herein.

FIG. 10 illustrates an example computer-implemented method for evaluating or assessing a time criticality or importance of installing a software patch for a third party component in an application, in accordance with the principles of the present disclosure.

DETAILED DESCRIPTION

Computer-implemented systems and methods (collectively "solutions") for automated assessments of a time relevance of installing patches for defective third-party components of software applications are described herein.

Software applications ("applications") may include any number of components, which may be sourced from third parties (including, for example, open-source components sourced from the free and open source software ("FOSS") community). A third-party component included in an application may be discovered to be defective after the application has been released or is ready to be released to end-users. The defect in the third party component may relate to performance, usability or security of the component. A software patch ("patch," "open-source patch" or "bug-fix") may be available for the defective third-party component.

The relevance of a defective third-party component patch or bug-fix on the operation of the application may depend on the state or context of use of the application ("application context"). The relevance of the patch can be immediate, for example, when programming constructs (e.g., objects, functions, methods, etc.) of the defective third-party component are, in the application context, used or executed by any programming constructs of the application. Accordingly, it may be imperative to install the patch for the defective third-party component on an urgent basis to avoid immediate damage due to the defective third-party component in the application. Conversely, the relevance of the patch may be minimal, for example, when programming constructs of the defective third-party component are in the application context, not used or executed by any programming constructs of the application. Accordingly, the patch for the defective third-party component is not urgently needed and could be installed later (or the defective component could be replaced) during the application's regular release or maintenance cycle without risk of immediate damage to application end-users in the application context.

As described herein, the solutions for automated assessments of the relevance of a patch for a defective third-party component may involve accurate and granular identification of the "defective" programming constructs of the defective third-party component, in accordance with the principles of the disclosure herein. The solutions may be understood with reference FIG. 1, which schematically shows a Venn diagram 100 in which programming constructs of an application A are represented by the set $S_A$, defective programming constructs of a third party component $C_i$ are represented by the set $C_{ij}$, and execution traces of application A are represented by the set $T_A$.

Figure 1:
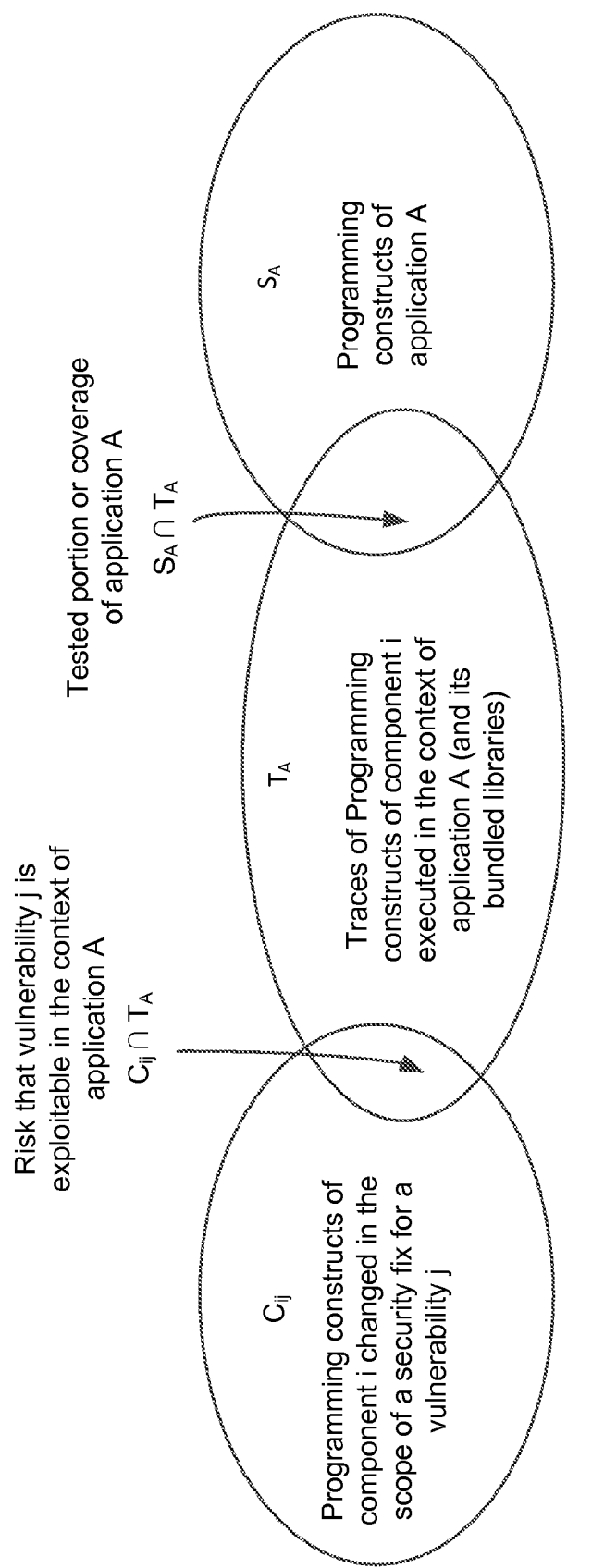
FIG. 1 is a Venn diagram in which programming constructs of an application A, defective programming constructs of a third party component Ci, and execution traces of the application A are represented by intersecting sets, in accordance with the principles of the present disclosure.

The solutions may involve testing or determining whether the coding of the defective third-party component (e.g., component $C_i$) is actually invoked when the application is running or executing in a specific context (e.g., by a given user, at a given time or for given functionalities). In particular, the testing or determining may involve assembling a list (a "change" list) of programming constructs of the defective third-party component that are changed, fixed or corrected by the given patch for the defective third-party component. In FIG. 1, an example change list of a patch for component $C_i$ and defect j is represented by the set $C_{ij}$. The change list may be built on the basis of, for instance, patch information, which may be available from the patch providers, or publicly accessible component source code repositories (in case of open-source software components). The testing or determining may further involve comparing the change list with actual execution traces of the application to determine whether the programming constructs changed, fixed or corrected by the given patch for the defective component are relevant in the application context. The execution traces of the application may document or record actual execution of programming constructs at application runtime in the application context (e.g., during application tests or during productive use of the application). The execution traces may be collected for both programming constructs belonging to the application as well as for programming constructs belonging to the third-party components used in the application. In FIG. 1, example execution traces of application A in the application context are represented by the set $T_A$. As shown in the figure, an intersection of the programming constructs of application A and the execution traces (i.e. $S_A \cap T_A$) may represent a portion of the application constructs that is sampled or represented by the execution traces. Further, a non-zero intersection of execution traces and the change list (i.e. $C_{ij} \cap T_A$) for the given patch confirms that a programming construct (e.g., changed, fixed or corrected by the given patch for the defective third-party component $C_i$) is indeed used when the application is running or executing in the specific context. Such confirmation may indicate that there is a substantial risk that the defect or bug (e.g., vulnerability j) in the defective third-party component $C_i$ will affect operation of the application in the context of application use. Accordingly, immediate installation of an application patch including the component patch may be recommended.

An aspect of the foregoing assessments of the relevance of the patch for the defective third-party component may involve a notion of "test coverage" i.e. a portion or fraction of the application that is sampled or represented by the execution traces (e.g., FIG. 1, $S_A \cap T_A$). Not every programming construct of the application may be executed or tested in the specific context. It may be expected that the assessments of the relevance of the patch for the defective third-party component may be more reliable and less likely to suffer from false negatives as the test coverage increases. In order to estimate the risk of error in the assessments due limited test coverage, the solutions described herein may include collecting a set of programming constructs belonging to the application itself ("application constructs") and evaluating a size of the intersection between the application constructs and execution traces (e.g., FIG. 1, $S_A \cap T_A$) as a measure of the test coverage.

Figure 2:
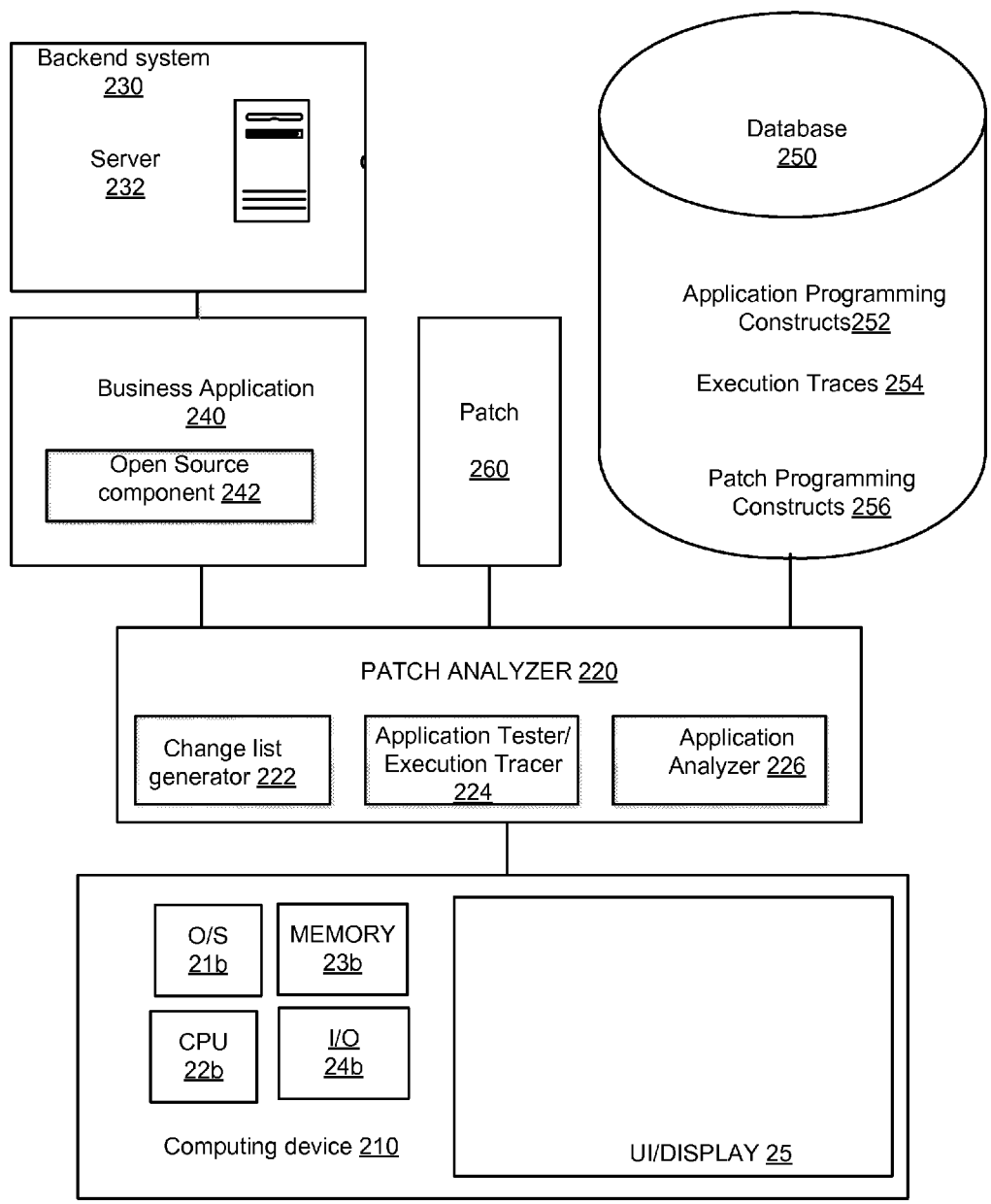
FIG. 2 is a schematic block diagram of an example system for automated assessments of the relevance of a patch for a defective third-party component of a software application, in accordance with the principles of the present disclosure.

FIG. 2 is a schematic block diagram showing an example system 200 for automated assessments of the relevance of a patch (e.g., patch 260) for a defective third-party component 242 (e.g., open source component 242) in a software application (e.g., business application 240), in accordance with the principles of the present disclosure.

System 200 may be configured for testing or analyzing all kinds of software applications (e.g., business applications, Web applications, mobile device applications, embedded software, etc.), programming languages and bug or defect categories (e.g., performance, usability or security defects). System 200 may be use in example scenarios in which there is public or private access to the source code repository of the third-party component (e.g., open source component 242) and the source code repository of the application (e.g., business application 240) being tested, and further where application execution traces can be collected (e.g., during application tests or other use of the application). For convenience in description herein, Java programming language and security bugs (vulnerabilities) may be used as examples in the use scenarios described herein. Further, the terms "defect" and "bug" may be used interchangeably herein. Similarly, the terms "patch" and "bug-fix" may be used interchangeably herein.

System 200 includes a patch analyzer 220, which may be coupled to a database 250. Patch analyzer 220 may, for example, be hosted on a computing device 220, which includes an O/S 21b, a CPU 22b, a memory 23b, and I/O 24b, may further include a user interface (UI) or display 25. Although computing device 210 is illustrated in the example of FIG. 2 as a single computer, it may be understood that computing device 210 may represent two or more computers in communication with one another. Therefore, it will also be appreciated that any two or more components 220-260 of system 100 may similarly be executed using some or all of the two or more computing devices in communication with one another. Conversely, it also may be appreciated that various components illustrated as being external to computer 210 may actually be implemented therewith.

In an example scenario, the software application (e.g., business application 240) may be an application, which can run on computing device 210 or, for example, in another computing environment (e.g., Backend system 230/Server 232). The software application may include one or more third-party components (e.g., open source component 242). The one or more third party components may include nested components (not shown). In the example scenario, the third party component (e.g., open source component 242) may have defect or bug (e.g., a performance, usability or vulnerability defect or bug) for which a bug-fix or patch (e.g., patch 260) is available. Patch 260 may have been obtained, for example, from the developers of the third party component or from other public or private organizations (e.g., NIST, Apache Software Foundation, etc.) that publish software vulnerabilities and patches.

Patch analyzer 220, which may be coupled to a database 250, may include processes configured to test or analyze the application (e.g., business application 240), the defective third-party component (e.g., open source component 242), and the patch (e.g., patch 260) to determine the relevance or importance of the patch in an application state or context.

Patch analyzer 220 may be configured to identify and list programming constructs of the defective component that are changed, fixed or corrected by patch 260 in a change list (e.g., patch programming constructs 256). Patch analyzer may be further configured to collect execution traces (e.g., execution traces 154) of business application 240 at application runtime (e.g., during application tests or during productive use of the application) in the context of application use. By comparing programming constructs in execution traces 254 with change list 256, patch analyzer 220 may determine if any of the programming constructs of the defective component that are changed, fixed or corrected by patch 260 are used by the programming constructs of business application in the application state or context. Patch analyzer 220 may accordingly generate an assessment of the criticality or urgency of installing patch 260 in application 240. If no programming constructs of the defective component that are changed, fixed or corrected by patch 260 are used by the programming constructs of business application 240 in the application state or context, then installation of patch 260 may not be urgent or critical.

Patch analyzer 220 may be further configured to analyze the application (e.g., business application 240) and generate a list of all the programming constructs in the application (e.g., application programming constructs 152). By comparing application programming constructs 252 with execution traces 254, patch analyzer 220 may quantify a test coverage metric, which may be used to indicate a degree of confidence that should be associated with foregoing assessment of the criticality or urgency of installing patch 260 based on execution traces collected in the application context. A test coverage of 100% may, for example, mean that all programming constructs of the application have been executed and are included in the execution traces in the scope of tests and thus indicate high degree of confidence that all likely circumstances of use of programming constructs of the defective component that are changed, fixed or corrected by patch 260 have been investigated.

In an example implementation, the foregoing test and assessment processes may be included in patch analyzer 220, for example, in a change list generator module 222, an application tester/execution tracer module 224, and application analyzer module 226.

Change list generator module 222 may include processes to create a change list (e.g., patch programming constructs 256) which includes programming constructs of the software component (e.g., open source component 242) that are fixed or corrected in the scope of patch 260. Change list generator module 222 may be coupled to standard versioning systems (e.g., versioning control system (VCS) 350, FIG. 3) that may allow retrieval and analysis, for example, of complete code bases for given releases of the software component (e.g., open source component 242). The processes of change list generator module 222 may be configured to provide additional semantics to bare information obtained from the standard versioning systems. The processes may identify all programming constructs that were changed or altered between two different version uploads or commits of the software component in the versioning control systems. Change list generator module 222 may operate on the assumption that the programming constructs that were changed or altered between two different commits of the software component are the cause of the patched-up defect in the software component.

In an example implementation, change list generator module 222 may be configured to retrieve source code bases for two different releases of a software component (e.g., open source component 242) from the versioning control systems. A first release (i.e. a current version) of the software component may be the release containing a fix for the defect or bug (which in case of well-maintained open-source software (OSS) is typically mentioned in bug or vulnerability reports). A second release (i.e., the previous version) of the software component may be the one that includes the defect or bug addressed by the patch. Change list generator module 222 may compare the two different releases to find a number of changes in various source code files in the source code repository/versioning control systems. Files that are changed in the scope of the patch (e.g., patch 260), and which contain executable programming code, may be further analyzed to identify defective programming constructs in a given programming language (e.g., a class method or constructor in object-oriented programming, or subroutines in structured programming languages) of the software component. The analysis may be based on the comparison of abstract syntax trees created for both pre-patch and post-patch versions of the executable files.

Figure 3:
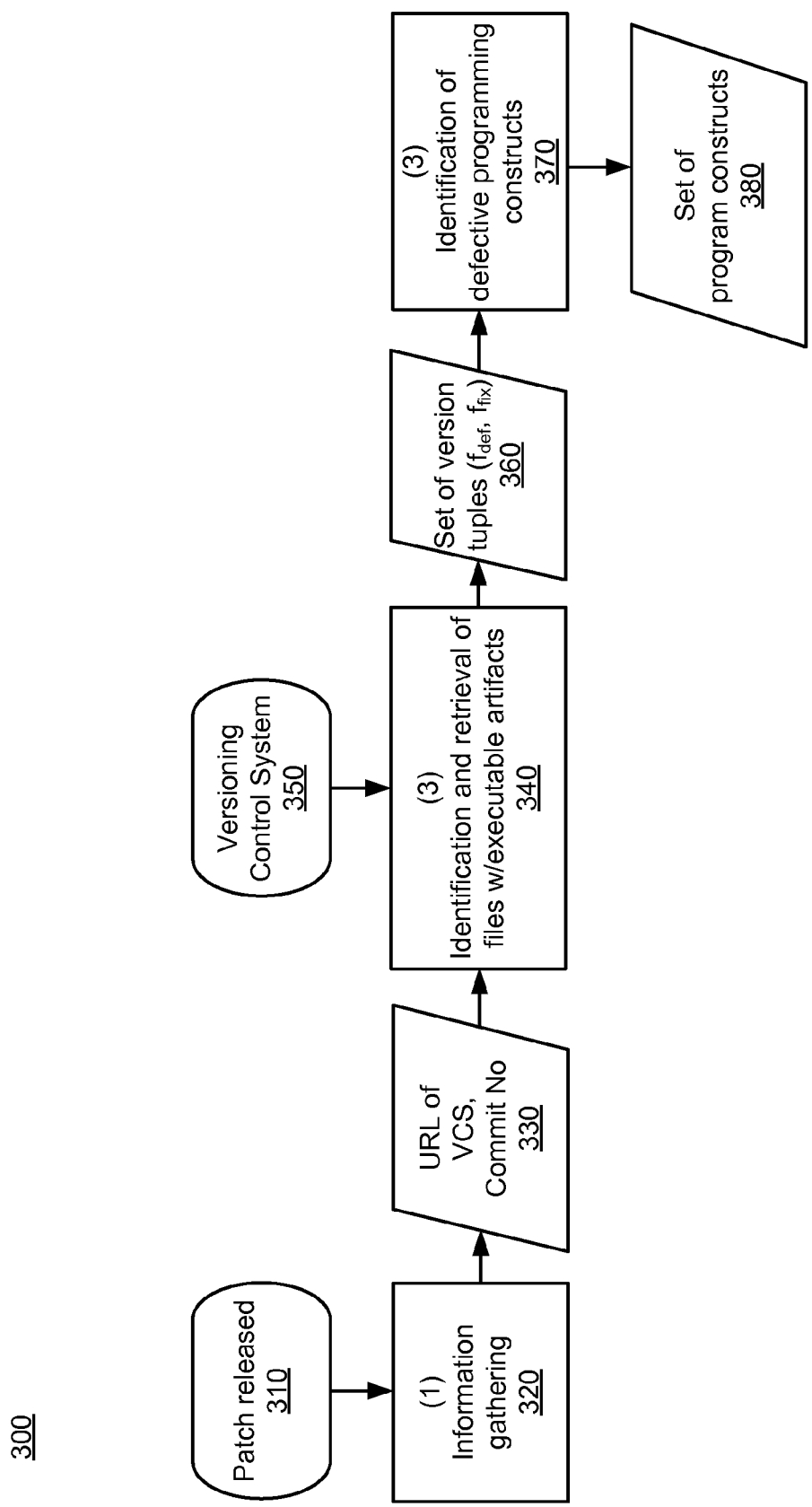
FIG. 3 is a schematic illustration of an example implementation of patch analysis processes of a patch analyzer/change list generator module for constructing a change list for a given software component patch, in accordance with the principles of the present disclosure.

FIG. 3 shows schematically an example implementation of patch analysis processes 300 of patch analyzer 220/change list generator module 222 for constructing the change list for a given patch (e.g., patch 260) for a given software component (e.g., open source component 242), in accordance with the principles of the present disclosure.

In the example implementation, information gathering process 320 of patch analysis processes 300 may be triggered by the release 310 of a patch (e.g., patch 260) fixing a previously disclosed software defect in the given software component (e.g., open source component 242). Information gathering process 320 may, for example, include acquiring a link or URL of a Versioning Control System (VCS) (350) having the source code and other data related to unpatched and patched versions of the given software component, and the commit numbers associated with the files of the unpatched release (previous version) and patched release (current version) of the given software component. The VCS and commit numbers 330 may be used to identify all files (in the source code) having executable programming code that have been changed (e.g., deleted, added, or modified) in the scope of the respective commits. These files with executable programming code could be potentially executed in the operation of the software application (e.g., business application 240), in contrast to files without executable programming code (e.g., files related to documentation or testing, etc.). Depending on the changes, up to two versions of every relevant file may be retrieved by identification and retrieval process 340 from VCS 350.

In the case the change to a relevant file is an addition or modification, the version of the file added or modified in the scope of the commit may be called the fixed file version ($f_{fix}$), while the previous version of the file, assumed to be defective, may be called the defective file version ($f_{def}$). In the case the change to the relevant file is a deletion, the previous or deleted version of the file may also be called the defective file version ($f_{def}$). The retrieved previous and current versions of the relevant files are shown in FIG. 3, for example, as a set of file version tuples ($f_{def}$, $f_{fix}$) 360.

Further in patch analysis processes 300, set of file version tuples ($f_{def}$, $f_{fix}$) 360 may be used by process 370 for identification of defective programming constructs in the given software component (e.g., open source component 242), which may have been fixed or patched in the scope of the released patch (e.g., patch 360). The defective programming constructs that are so identified may be of different granularity (e.g., software package, object, class, method or function, etc.) and may depend on the specific programming language used. The defective programming constructs (which are labeled as a set of programming constructs 380 in FIG. 3 or as patch programming constructs 256 in FIG. 2) may be further compared with application execution traces (e.g., execution traces 254) by patch analyzer 320 to assess the criticality of the released patch (e.g., patch 260) as previously described, for example, with reference to FIG. 2.

An example use case relates to software security vulnerabilities (e.g., CVE-2013-0239 and CVE-2013-0248), which represent a possible category of defects/patches that can be analyzed by patch analyzer 220 for a third-party component (e.g., OSS components Apache CXF and Apache FileUpload). In the example use case, the URL of the Versioning Control System (VCS) storing the source code and other data related to the open source component may be publicly available. For example, the VCS used for the OSS component Apache CXF may have a published URL corresponding to the 'http:' website 'svn.apache.org/viewvc/cxf/trunk/rt/ws/security/', which may allow public access to source code files of that component.

Implementations of patch analysis processes 300 (information gathering process 320, identification and retrieval process 340, and process 370) leading to identification of defective programming constructs of an open source component (e.g., OSS component Apache CXF) for which a patch (e.g., patch 260) is available are described below. The defective programming constructs may, for example, be identified as defective code blocks in Java-based software libraries of the open source component.

Information Gathering Process 320

Information gathering process 320 of patch analysis processes 300 may trivially acquire the URL of the VCS system for the subject open source component, for example, by conducting an Internet search. However, acquiring the commit numbers associated with the files of the unpatched (previous) and patched (current) versions of the given software component may be involve alternate approaches depending, for example, on the extent of the information associated with defects (or vulnerabilities) that may be available in public bug or defect reports (e.g., reports generated by defect tracking systems or vulnerability databases).

In some instances, a bug or defect report may reference or name the actual patched version of the given software component. For example, the vulnerability report for CVE-2013-0239, contains a direct reference to an HTML view on the source code repository. In such instances, information gathering process 320 may infer the commit number from the reference or name of the actual patched version of the given software component in the bug or defect report.

In other instances, the bug or defect report may merely mention a list of affected releases of the given software component. However, the software defects may be associated with identifiers, which identifiers may then also be reflected in comments to source code commits in versioning control systems (e.g., Apache Software Foundation's Subversion (SVN) system). In such instances, information gathering process 320 may search the textual comments added to the source code commits in the versioning control systems for a defect identifier. Such searching may allow information gathering process 320 to find a commit number for an actual patched version of the source code for a given software component.

Alternatively, in instances where the bug or defect report merely mention a list of affected releases of the given software component, acquiring commit numbers by information gathering process 320 may involve finding the first release update that is not affected by the defect (that is the first release in which the problem is fixed). This release (which may be a minor update) may be found using central online OSS repositories or project-specific pages of online source code management systems. Information gathering process 320 may then involve finding the commit number of the respective release update by searching through commit messages and tags or directly on the websites.

Identification and Retrieval Process 340

Identification and retrieval process 340, which is directed to identifying and retrieving all executable files (of the subject open-source component) that have been changed (e.g., deleted, added, or modified), may involve first identifying all files that have been altered in the context of a given commit number and filtering out files that are non-executable. Identification and retrieval process 340 may then involve retrieving fixed (patched) and defective (unpatched) file versions of the remaining executable files.

Identification and retrieval process 340 may obtain a list of all files that have been altered by a given commit from the versioning control system (VCS) system for the subject open source component. In the case of an example versioning control system (e.g., Apache Software Foundation's Subversion (SVN) system), process 340 may obtain a list of all files that have been altered, for example, by issuing the following command:

svn diff-c<COMMIT_NO>—summarize, where <COMMIT_NO> is the commit number obtained during information gathering process 320.

Identification and retrieval process 340 may recognize that all files that have been altered are not necessarily executable. Some of the altered files may be non-executable files. Examples of non-executable files may include documentation, test files, test data, and project management files, etc. Such non-executable files may be filtered out by identification and retrieval process 340 based on file related information (e.g., file extensions, directory structures, project management tools, or content inspection) (not shown).

Once the non-executable files have been filtered out, identification and retrieval process 340 may populate F, a set of file tuples ($f_{def}, f_{fix}$), where $f_{def}$ represent the defective or unpatched version of an executable file (if any) and $f_{fix}$ represents the fixed or patched version of the executable file (if any). For the cases, where files are deleted or added by the patch, the file tuples may be have only one populated element (e.g., ($f_{def}$,-) and (-,$f_{fix}$), respectively). For the cases where files are modified by the patch, the file tuples may have two populated elements (e.g., ($f_{def}, f_{fix}$)).

Process 370 for Identification of Defective Programming Constructs

Process 370 may analyze each tuple ($f_{def}, f_{fix}$) in set F to identify programming constructs that have been changed between the defective or unpatched version release and the patched version release of the given software component. The type and granularity of programming constructs may depend on the programming language (e.g., Java) used for a given executable file. Example programming constructs may include Java packages, Java class methods or C functions, single Java statements, etc.

To identify the defective programming constructs for a tuple (($f_{def}, f_{fix}$), process 370 may involve pretty-printing both executable files ($f_{def}, f_{fix}$) and removing comments (which may not have any impact on the runtime behavior of the respective source code). Process 370 may further involve creating tree-based representations of the syntax (i.e. abstract syntax trees (ASTs)) for both executable files $f_{def}$ and $f_{fix}$ using, for example, a language-specific parser (not shown).

Figure 4:
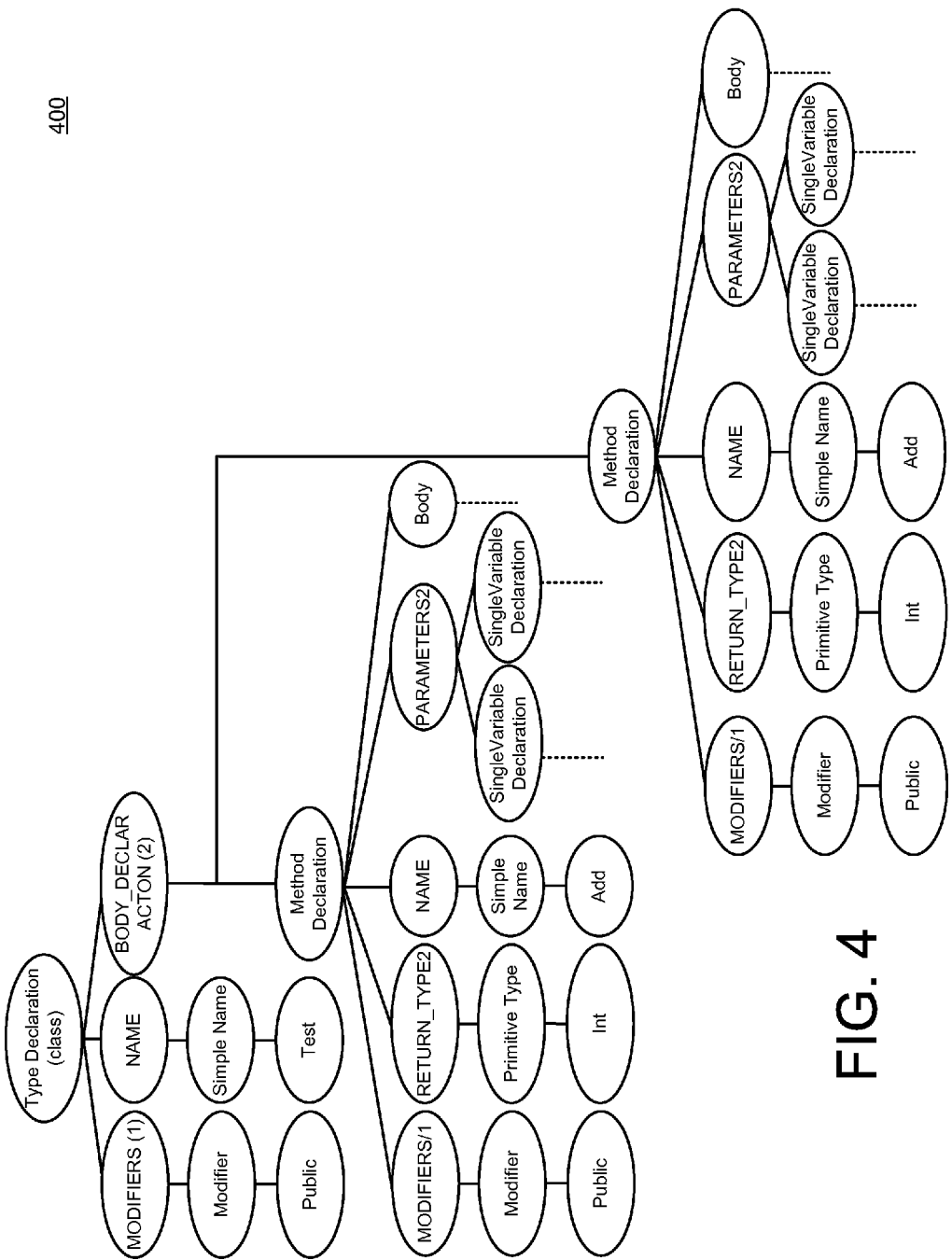
FIG. 4 is an illustration of an example abstract syntax tree (AST) for a Java class definition, in accordance with the principles of the disclosure herein.

For purposes of illustration, FIG. 4 shows an excerpt of an example AST 400 for the following Java class definition:

```
public class Test {
    public int add(int a, int b)return a+b; public int
    sub(int a, int b)return a-b;
}
```

AST 400 as shown in FIG. 4 includes example programming constructs, which in general have a construct identifier and a construct body. For Java method declarations, branches defined by modifiers, return type, name and parameters may represent the construct identifier, while the branch defined through the body node represents the construct body.

As noted previously for the cases where files are deleted or added by the patch, the file tuples may be have only one element (e.g., ($f_{def}$,-) and (-,$f_{fix}$), respectively). For such tuples (i.e. where $f_{fix}$ or $f_{def}$ are empty, respectively) only one AST may be created process 370 for the populated element of the file tuple (i.e. $f_{def}$ or $f_{fix}$). All constructs defined in the one AST may be added to the set of defective programming constructs 380.

For all files reported as being modified in the patch commit, a comparison of the two ASTs for the files $f_{fix}$ and $f_{def}$ in the file tuple may be carried out by process 370 to identify the relevant programming constructs that may have been changed. For this purpose, branches representing programming constructs (e.g., Java method declarations consisting of modifiers, return type, name, parameters and body, etc.) may be identified in both ASTs. While some programming constructs may be explicitly defined within single files (e.g., Java classes or methods) other programming constructs may be defined implicitly. A Java package, for example, may be defined through the ensemble of Java classes belonging to the package. Changes to such programming constructs may be recognized during the processing of single files. If at least one programming construct of a package is modified, the package may also be considered to be modified. If all programming constructs that were formerly defined for a given package have been deleted in the scope of a patch, the package as such may also be considered to be deleted.

An example decision algorithm (e.g., algorithm 500, FIG. 5) may be employed by process 370 to evaluate the two ASTs for the files $f_{fix}$ and $f_{def}$ in the file tuple and determine which programming constructs belong to the set of defective programming constructs 380.

Figure 5:
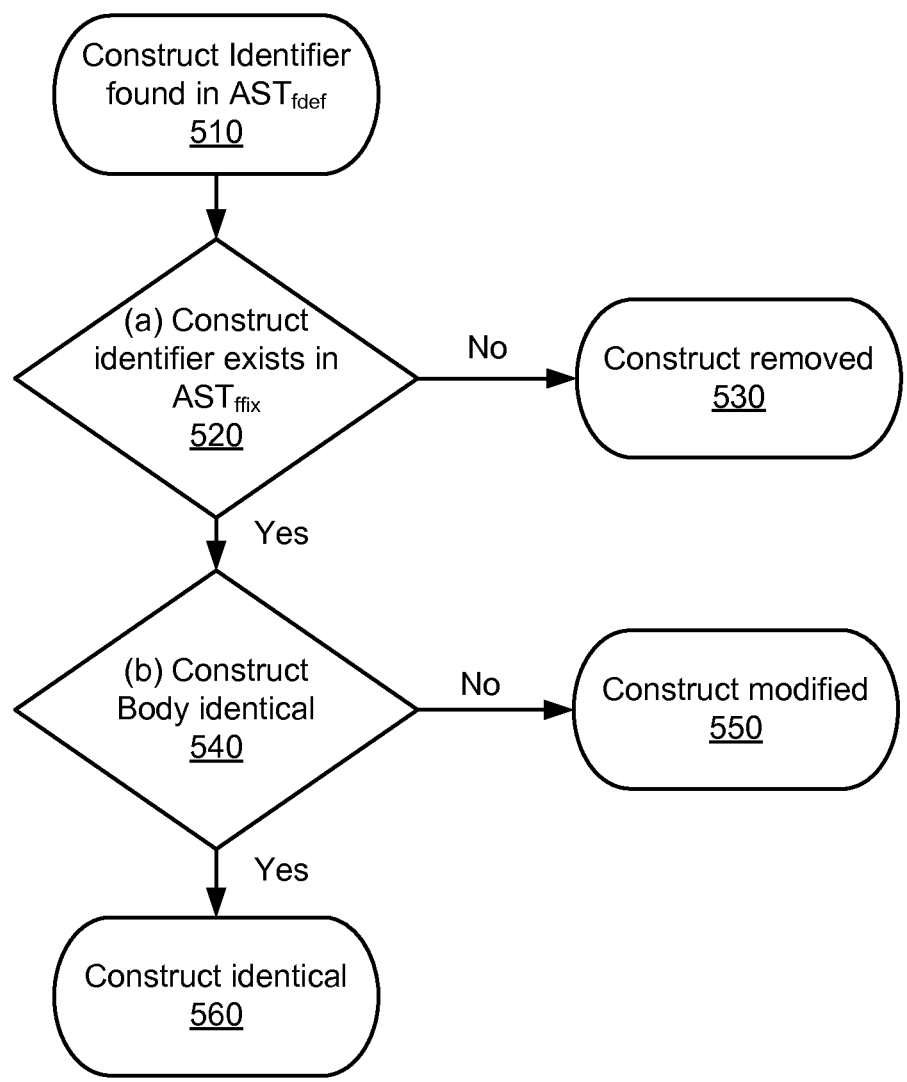
FIG. 5 illustrates an example decision algorithm which may be employed by a process to evaluate the ASTs and determine which programming constructs belong to a set of defective programming constructs, in accordance with the principles of the disclosure herein.

For purposes of illustration, decision algorithm 500 is shown in FIG. 5 as being applied to the AST for file $f_{def}$. However, it will be understood that a similar or equivalent decision algorithm may be used for the AST for file $f_{fix}$.

In decision algorithm 500, a program construct identifier is found in the AST for file $f_{def}$ at 510. At 520, a comparison may be made to determine whether the program construct identifier found at 510 also exists in the AST for file $f_{fix}$. If the result at 520 is negative, the program construct may be assumed to have been removed in the scope of the patch and may, at 530, be added as a defective programming construct to the set of defective programming constructs 380.

Conversely, if the result at 520 is positive (i.e. the construct identifier found at 510 also exists in the AST for file $f_{fix}$), at 540, a determination may be made whether the construct body in the AST for file $f_{def}$ is identical to construct body in the AST for file $f_{fix}$. If the result at 540 is negative, the program construct may be assumed to have been modified in the scope of the patch and may, at 550, be added as a defective programming construct to the set of defective programming constructs 580. Conversely, if the result at 540 is positive (i.e. the construct body is identical in the two ASTs) it may be assumed that the unchanged construct is not a defective program construct.

A result of process 370/algorithm 500 may be a change list C, which may be formatted, for example, as a set of tuples (construct identifier, modification), where the construct identifier is the identifier of a programming construct that has been changed in the scope of the patch, and modification is the type of change of the programming construct (e.g., added, deleted, modified).

For purposes of illustration, FIG. 6 shows an example representation 600 of change list C (in JSON notation) in the foregoing use case for OSS component Apache CXF, revision 1438424. As shown in the figure, representation 600 of change list C may include the following information fields: field "vcs" (e.g., the VCS repository from where the source code was retrieved); field "revision" (e.g., the revision number related to the patch); array "constructChanges" (e.g., the list of programming constructs changed in the scope of the revision); and field "search" (e.g., the defect or bug that was fixed by the revision).

With renewed reference to FIG. 2, patch analyzer 220 includes application tester/execution tracer module 224 with processes to collect execution traces (e.g., execution traces 254) of the application at application runtime (e.g., during application tests or during productive use of the application).

The execution traces may be collected toward determining if any of the defective programming constructs in the change list are used by the application (or component) at application runtime. Patch analyzer 320 and application tester/execution tracer module 224 may be configured to collect execution traces on the granularity of programming constructs, e.g., class methods or constructors, in case of the Java programming language.

In an example implementation, collection of execution traces on the granularity of programming constructs may involve embedding instrumentation code into the programming constructs of the software application and third-party component. The instrumentation code (e.g., bytecode) may be configured to collect meta-information regarding the invocation of a programming construct (e.g., the date and time of the invocation) at application runtime, and to submit this information to patch analyzer 220 for analysis or storage.

In example implementations, application tester/execution tracer module 224 may be configured so that the embedded instrumentation code is executed at least once (e.g., to determine if a given programming construct is called at least once) in the application under test. In alternate implementations, the embedded instrumentation code may be executed repeatedly (e.g., in order to count the number of times a given programming construct invoked in application runtime).

Techniques for embedding instrumentation code in the program code of the application and third-party component may depend on the programming language (e.g., interpreted or compiled programming language) of both the application and third-party component.

In the case the programming language is a compiled programming language, the source code of the application and third-party component may be available to users. Embedding instrumentation code in the application and third-party component may involve modifying the source code of both the application and third-party component prior to the compilation process that produces platform specific machine code.

In the case the programming language is an interpreted programming language, the source code of the application or third-party component may be available to users as clear text (or other kind of platform-independent, intermediate representation or format), which can be later translated into platform-specific machine code and loaded by a virtual machine, for example, at application runtime. Embedding instrumentation code in the application and third-party component (when the programming language is an interpreted programming language) may involve modifying the source code or the intermediate representation of both the application and third-party component prior or during the translation/loading of the source code by the virtual machine.

Use Case Example of Java: a Hybrid Programming Language

Java is an example hybrid programming language system in which source code is compiled into an intermediate representation or format known as bytecode. The bytecode can then be interpreted by, or run on, the virtual machine for the platform specific runtime environment.

Figure 7:
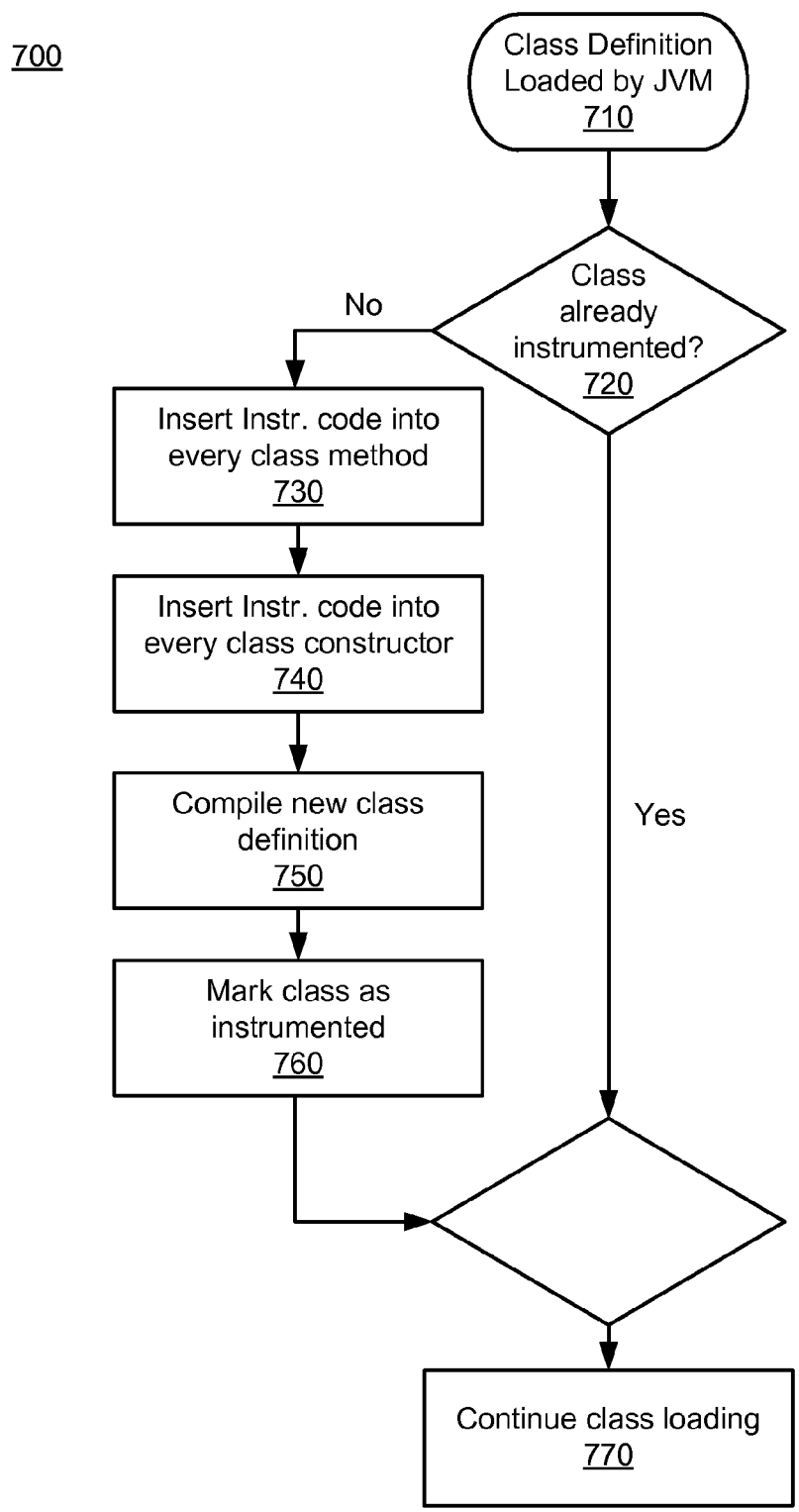
FIG. 7 illustrates an example process for embedding instrumentation code (Java bytecode) "on-the-fly" at the time a Java class definition is loaded for the first time by a Java Virtual Machine (JVM), in accordance with the principles of the present disclosure.
Figure 8:
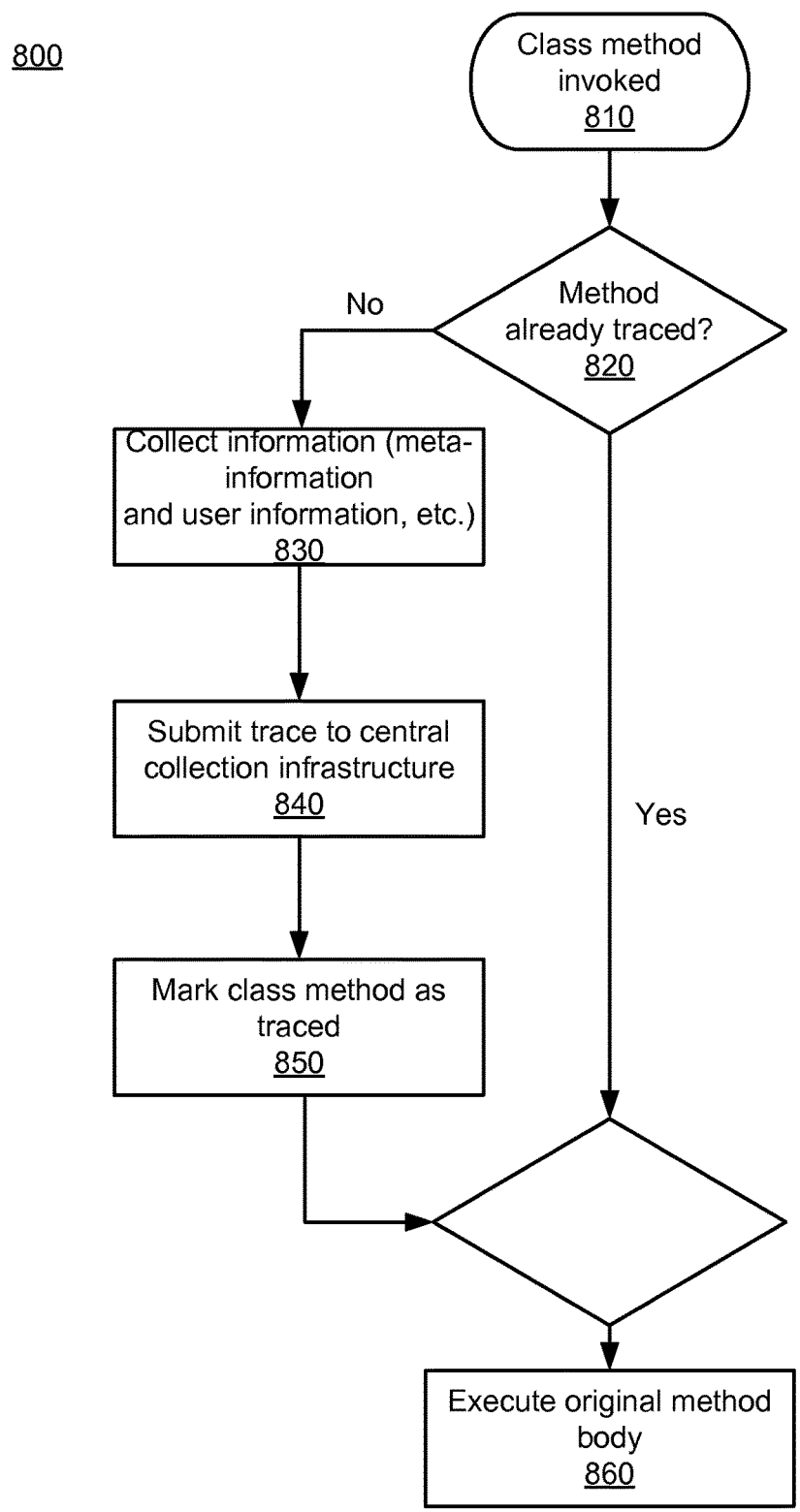
FIG. 8 illustrates an example process for execution trace collection for software programming constructs that include instrumentation code, in accordance with the principles of the present disclosure.

For purposes of illustration, FIGS. 7 and 8 show example processes for embedding instrumentation code and the collection of execution traces by patch analyzer 320 for a use case in which the application and the third-party component are programmed in Java. Embedding the instrumentation code for trace collection may involve modifying the Java bytecode of the application and/or the third-party component.

FIG. 7 shows an example process 700 for embedding the instrumentation code (Java bytecode) "on-the-fly" at the time a Java class definition (belonging to either the application or the third-party component) is loaded for the first time by a Java Virtual Machine (JVM), in accordance with the principles of the present disclosure.

In process 700, a class definition in the bytecode (belonging to either the application or the third-party component) may be loaded by the JVM at 710. At 720, a determination may be made whether the class is already instrumented (i.e., whether the class includes the instrumentation code). If the result at 720 is positive, process 700 may continue to class loading operation (770). If the result at 720 is negative, process 700 may involve inserting the instrumentation code in every class method (730) and inserting the instrumentation code in every class constructor (740). Process 700 may further continue to compile a new class definition (750) and to mark the compiled class as instrumented (760) before continuing to class loading operation 770.

As an alternative to the on-the-fly instrumentation during the JVM class loading operations used in process 700, another instrumentation process may involve embedding instrumentation code on Java archives residing in the file system rather than during the JVM class loading process 710-770 used in process 700.

FIG. 8 shows an example process 800 for execution trace collection for the programming constructs that include instrumentation code, in accordance with the principles of the present disclosure. Process 800 may be used for the case where it may be sufficient to determine if a given programming construct is called or executed at least once during application runtime.

Process 800 may begin at 800 when, for example, a class method (belonging to either the application or the third-party component) is invoked in application run time. At 820, a determination may be made whether the class method has already been traced. If the result at 820 is positive, process 800 may continue to execute the original method body (860). If the result at 820 is negative (i.e., the method has not been previously traced or is being traced for the first time), process 800 may include collecting the trace (i.e. meta information and user information) (830), and submitting the trace to a central collection infrastructure (e.g., patch analyzer 220/data base 250) (840). Process 800 may further include marking the class method as having been traced (850) before continuing to execute the original method body 860.

For purposes of illustration, FIG. 9 shows example traces 900 collected for an example Java application in an application context using, for example, process 800. The example traces 900 shown in FIG. 9 may include the following information fields: fields project.groupId, project.artifactId and project.version (e.g., describing the application context); field constructUsage.construct.qname (e.g., the method and class name of an actual invocation of the open-source component); and field resources.archiveFileName (e.g., the Java archive from which the class was loaded).

FIG. 10 shows an example computer-implemented method 1000 for evaluating or assessing a time criticality or importance of installing a software patch for a third party component in a software application, in accordance with the principles of the present disclosure.

Method 1000 may include identifying a set of defective programming constructs of the component that are altered by the patch (1010), collecting execution traces of programming constructs of the software application and programming constructs of the component in a context of application use (1020), and evaluating the execution traces to determine whether one or more defective programming constructs of the component are invoked in the context of application use (1330).

In method 1000, identifying a set of defective programming constructs of the component that are altered by the patch may include comparing a pre-patch version and a post-patch version of the source code of the component to identify defective programming constructs of the component that are altered by the patch (1012). Identifying the set of defective programming constructs may involve retrieving executable files of the component (that have been added, deleted or modified by the patch) from the pre-patch and the post-patch versions of the source code of the component (1014).

Method 1300 may further include creating abstract syntax tree (AST) representations of the executable files (1016) retrieved at 1014. The ASTs may define programming constructs of the executable files.

Method 1000 may further include, for executable files of the component that have been added or deleted by the patch, adding all programming constructs identified by the respective AST representations of the added or deleted executable files to the set of defective programming constructs of the component (1018). For an executable file of the component that has been modified by the patch, method 1000 may include comparing AST representations of the pre-patch and post-patch versions of the executable file to identify programming constructs that have been modified by the patch (1019).

In method 1000, collecting execution traces of programming constructs of the software application and programming constructs of the component in a context of application use 1020 may include embedding instrumentation code in the code of the programming constructs.

Further, method 1000 may also include generating and comparing a list of all the programming constructs in the software application with the execution traces to quantify a test coverage metric.

The various systems and techniques described herein may be implemented in digital electronic circuitry, or in computer hardware, firmware, or in combinations of them. The various techniques may implemented as a computer program product, i.e., a computer program tangibly embodied in a machine readable storage device (e.g., a non-transitory computer-readable storage medium), for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, logic circuitry or special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for securing a computer system against unauthorized access via a defective third-party component of a software application running on the computer system, the method comprising:

assembling a list of programming constructs of the defective third-party component that are altered by a patch for the defective third-party component;

sampling a subset of the application by collecting execution traces of programming constructs of the application that are used in a context of application use the sampled subset represented as an intersection of the programming constructs of the application and the collected execution traces representing a size of the sampled subset of the application;

comparing the list with the execution traces to determine whether the programming constructs altered by the patch for the defective third-party component are invoked by the sampled subset of application;

based on a fraction of the programming constructs of the defective third-party component in the software application that will be altered by the patch when installed in the software application and will be invoked in the context of application use, and the size of the sampled subset of the application, determining an urgency of installing the patch in the software application for the context of application use; and installing the patch for the defective third-party component in the software application for securing the computer system against unauthorized access, based on the determined urgency.

2. The method of claim 1, wherein assembling the list of programming constructs of the defective third-party component that are altered by the patch for the defective third-party component includes comparing a pre-patch version and a post-patch version of source code of the component to identify defective programming constructs of the component that are altered by the patch.

3. The method of claim 2, wherein comparing the pre-patch and post-patch versions of the source code of the component to identify defective programming constructs of the component includes retrieving executable files of the component that have been added, deleted or modified by the patch from the pre-patch and the post-patch versions of the source code of the component.

4. The method of claim 3 further comprising creating abstract syntax tree (AST) representations of the executable files, wherein the AST define programming constructs of the executable files.

5. The method of claim 4, wherein for executable files of the component that have been added or deleted by the patch, all programming constructs identified by the respective AST representations of the added or deleted executable files are added to the list of programming constructs of the defective third-party component.

6. The method of claim 4 further comprising, for an executable file of the component that has been modified by the patch, comparing AST representations of pre-patch and post-patch versions of the executable file to identify programming constructs that have been modified by the patch.

7. The method of claim 1, wherein collecting execution traces of programming constructs of the application that are used the context of application use in a context of application use includes embedding instrumentation code in code of the programming constructs.

8. The method of claim 1 further comprising generating a list of all the programming constructs in the software application and comparing the list of all the programming constructs with the execution traces to quantify a test coverage metric.

9. A system for securing a computer system against unauthorized access via a defective third-party component of a software application running on the computer system, the system comprising a memory and a semiconductor-based processor, the memory and the processor forming one or more logic circuits configured to:

assemble a list of programming constructs of the defective third-party component that are altered by a patch for the defective third-party component;

sample a subset of the application by collecting execution traces of programming constructs of the application that are used in a context of application use, the sampled subset represented as an intersection of the programming constructs of the application and the collected execution traces representing a size of the sampled subset of the application;

compare the list with the execution traces to determine whether the programming constructs altered by the patch for the defective third-party component are invoked by the sampled subset of application;

based on a fraction of the programming constructs of the defective third-party component in the software application that will be altered by the patch when installed in the software application and will be invoked in the context of application use, and the size of the sampled subset of the application, determine an urgency of installing the patch in the software application for the context of application use; and install the patch for the defective third-party component in the software application for securing the computer system against unauthorized access, based on the determined urgency.

10. The computer system of claim 9, wherein the logic circuits are configured to compare a pre-patch version and a post-patch version of source code of the component to identify defective programming constructs of the component that are altered by the patch.

11. The computer system of claim 10, wherein the logic circuits are configured to compare the pre-patch and post-patch versions of the source code of the component to identify defective programming constructs of the component by retrieving all executable files of the component that have been added, deleted or modified by the patch from the pre-patch and the post-patch versions of the source code of the component.

12. The computer system of claim 11, wherein the logic circuits are configured to create abstract syntax tree (AST) representations of the executable files, wherein the AST define programming constructs of the executable files.

13. The computer system of claim 12, wherein the logic circuits are further configured to, for executable files of the component that have been added or deleted by the patch, add all programming constructs identified by the respective AST representations of the added or deleted executable files to the list of programming constructs of the defective third-party component.

14. The computer system of claim 12, wherein the logic circuits are further configured to, for an executable file of the component that has been modified by the patch, compare AST representations of pre-patch and post-patch versions of the executable file to identify programming constructs that have been modified by the patch.

15. The computer system of claim 9, wherein the logic circuits are further configured to collect execution traces of programming constructs of the software application and programming constructs of the component in a context of application use by embedding instrumentation code in code of the programming constructs.

16. The computer system of claim 9, wherein the logic circuits are further configured to generate a list of all the programming constructs in the software application and comparing the list of all the programming constructs with the execution traces to quantify a test coverage metric.

17. A non-transitory computer readable storage medium having instructions stored thereon, including instructions which, when executed by a microprocessor, secure a computer system against unauthorized access via a defective third-party component of a software application running on the computer system, the instructions including instructions that cause the microprocessor to:

assemble a list of programming constructs of the defective third-party component that are altered by a patch for the defective third-party component;

sample a subset of the application by collecting execution traces of programming constructs of the application that are used in a context of application use the sampled subset represented as an intersection of the programming constructs of the application and the collected execution traces representing a size of the sampled subset of the application;

compare the list with the execution traces to determine whether the programming constructs altered by the patch for the defective third-party component are invoked by the sampled subset of application;

based on a fraction of the programming constructs of the defective third-party component in the software application that will be altered by the patch when installed in the software application and will be invoked in the context of application use, and the size of the sampled subset of the application, determine an urgency of installing the patch in the software application for the context of application use; and install the patch for the defective third-party component in the software application for securing the computer system against unauthorized access, based on the determined urgency.

18. The non-transitory computer readable storage medium of claim 17, wherein instructions stored thereon include instructions which cause the microprocessor to compare a pre-patch version and a post-patch version of source code of the component to identify defective programming constructs of the component that are altered by the patch.

19. The non-transitory computer readable storage medium of claim 18, wherein instructions stored thereon include instructions which cause the microprocessor to compare the pre-patch and post-patch versions of the source code of the component to identify defective programming constructs of the component by retrieving all executable files of the component that have been added, deleted or modified by the patch from the pre-patch and the post-patch versions of the source code of the component.

20. The non-transitory computer readable storage medium of claim 19, wherein the instructions stored thereon include instructions which cause the microprocessor to create abstract syntax tree (AST) representations of the executable files, wherein the AST define programming constructs of the executable files.

* * * * *